(12) United States Patent
Kim (10) Patent No.: US 9,958,003 B2
(45) Date of Patent: May 1, 2018

(54) HYBRID DRIVE SHAFT USING FRICTION-STIR WELDING AND FABRICATION METHOD THEREOF

(71) Applicant: WOO SHIN EMC CO., LTD, Siheung (KR)

(72) Inventor: Dong Ho Kim, Seoul (KR)

(73) Assignee: WOO SHIN EMC CO., LTD., Siheung (KR)

( * ) Notice: Subject to any disclaimer, the term of this patent is extended or adjusted under 35 U.S.C. 154(b) by 0 days. days.

(21) Appl. No.: 14/654,743

(22) PCT Filed: Jan. 10, 2014

(86) PCT No.: PCT/KR2014/000306
§ 371 (c)(1),
(2) Date: Jun. 22, 2015

(87) PCT Pub. No.: WO2014/109592
PCT Pub. Date: Jul. 17, 2014

(65) Prior Publication Data
US 2015/0345540 A1    Dec. 3, 2015

(30) Foreign Application Priority Data

Jan. 11, 2013    (KR) .................. 10-2013-0003634

(51) Int. Cl.
*B23K 20/12*      (2006.01)
*F16C 3/02*       (2006.01)
(Continued)

(52) U.S. Cl.
CPC ............ *F16C 3/023* (2013.01); *B23K 20/122* (2013.01); *B23K 20/129* (2013.01); *B23K 20/24* (2013.01);
(Continued)

(58) Field of Classification Search
CPC ..... B23K 20/122–20/129; B23K 20/24; B23K 2201/04–2201/06; B23K 2201/005;
(Continued)

(56) References Cited

U.S. PATENT DOCUMENTS 4,173,128 A    11/1979  Corvelli
4,887,989 A *  12/1989  Kerecman ............... F16C 3/02
                                                    464/180
(Continued)

FOREIGN PATENT DOCUMENTS

CN    1212194    3/1999
CN    1275453    12/2000
(Continued)

OTHER PUBLICATIONS

Machine translation of JP 2002-137644A (no date available).*
Machine translation of CN 1275453A (no date available).*

*Primary Examiner* — Kiley Stoner
(74) *Attorney, Agent, or Firm* — Boyle Fredrickson S.C.

(57) ABSTRACT

The present invention relates to a hybrid drive shaft using friction-stir welding and a fabrication method thereof, and more particularly to a drive shaft comprising a metal tube, a composite material layer formed inside the metal tube, and a metal yoke connected to both ends of the drive shaft by means of friction-stir welding so as to make the components simple and lightweight and to enhance the durability, and a fabrication method thereof. The fabrication method comprises the steps of: shaping a composite material sheet; bonding the cylindrical composite material layer to the inside of a metal tube; maintaining the inside of the metal tube in a vacuum state for a given duration; heating the metal tube maintained in the vacuum state in an autoclave; and adjoining a connection member for connecting other parts to the ends of the metal tube.

3 Claims, 6 Drawing Sheets

(51) Int. Cl.
*B23K 20/24* (2006.01)
*B29C 70/34* (2006.01)
*B29L 31/00* (2006.01)
*B29K 105/00* (2006.01)
*B23K 101/04* (2006.01)

(52) U.S. Cl.
CPC .............. *B29C 70/34* (2013.01); *F16C 3/026* (2013.01); *B23K 2201/04* (2013.01); *B29K 2105/256* (2013.01); *B29L 2031/75* (2013.01)

(58) Field of Classification Search
CPC .......... F16C 3/023; F16C 3/026; B29C 70/34; B29C 2105/256
USPC ................ 228/112.1, 2.1, 114, 182; 464/181
See application file for complete search history.

(56) References Cited

U.S. PATENT DOCUMENTS

| | | | | |
|---|---|---|---|---|
| 4,888,224 | A * | 12/1989 | Zackrisson | F16C 3/026 138/128 |
| 4,895,551 | A * | 1/1990 | Fritz | F16C 3/026 464/180 |
| 4,952,195 | A * | 8/1990 | Traylor | F16D 3/387 464/181 |
| 5,245,888 | A * | 9/1993 | Tsuzuki | B29C 70/84 123/90.17 |
| 5,692,959 | A * | 12/1997 | Schabel | F16D 3/40 464/134 |
| 6,193,137 | B1 * | 2/2001 | Ezumi | B23K 20/122 228/112.1 |
| 6,336,986 | B1 | 1/2002 | Lee et al. | |
| 2001/0030222 | A1 * | 10/2001 | Konno | B23K 20/129 228/112.1 |
| 2001/0040179 | A1 * | 11/2001 | Tochigi | B23K 20/126 228/2.1 |
| 2002/0095903 | A1 * | 7/2002 | Kawasaki | B23K 20/122 52/578 |
| 2004/0082394 | A1 | 4/2004 | Lee et al. | |
| 2005/0176513 | A1 * | 8/2005 | Raymond | F16C 3/02 464/181 |
| 2008/0058108 | A1 * | 3/2008 | Lin | F16D 3/387 464/134 |
| 2008/0277036 | A1 * | 11/2008 | Johansen | B21C 37/0811 148/689 |
| 2011/0198820 | A1 * | 8/2011 | Janzen | B60G 21/055 280/124.106 |

FOREIGN PATENT DOCUMENTS

| | | | | |
|---|---|---|---|---|
| EP | 1279458 | | 1/2003 | |
| EP | 2561948 | A1 * | 2/2013 | ......... B23K 37/0531 |
| EP | 2561951 | A1 * | 2/2013 | ......... B23K 37/0531 |
| JP | 2002066767 | A * | 3/2002 | |
| JP | 2002137644 | | 5/2002 | |
| JP | 2006068782 | A * | 3/2006 | |
| JP | 2007-283379 | | 11/2007 | |
| JP | 2010-064634 | | 3/2010 | |
| JP | 2010064634 | | 3/2010 | |
| JP | 2012148297 | A * | 8/2012 | |
| KR | 10 1999 0014053 | | 2/1999 | |

* cited by examiner

HYBRID DRIVE SHAFT USING FRICTION-STIR WELDING AND FABRICATION METHOD THEREOF

The present invention relates to a drive shaft, and more particularly to a drive shaft which includes a metal tube, a composite material layer formed inside the metal tube, and a metal yoke connected to both ends of the drive shaft by means of friction-stir welding, thereby making the components simple and lightweight, enhancing the durability due to the reduction of noise and vibration and reducing energy, and a fabrication method thereof.

BACKGROUND ART

In general, a rear-wheel drive vehicle is configured such that a driving force generated by a front engine is transmitted to the rear wheel through a drive shaft connected to a transmission, so that the vehicle moves forward. The engine and transmission are mounted on the front of the vehicle. However, the vehicle is driven by driving the rear wheel instead of the front wheel of the vehicle. In the rear-wheel drive vehicle, the rear wheel is driven and the front wheel is steered. Therefore the rear wheel drive vehicle has comparative advantage in steering performance than the front wheel type. In details, the front and rear momentum are in balance for which it produces perfect balance.

Figure 1:
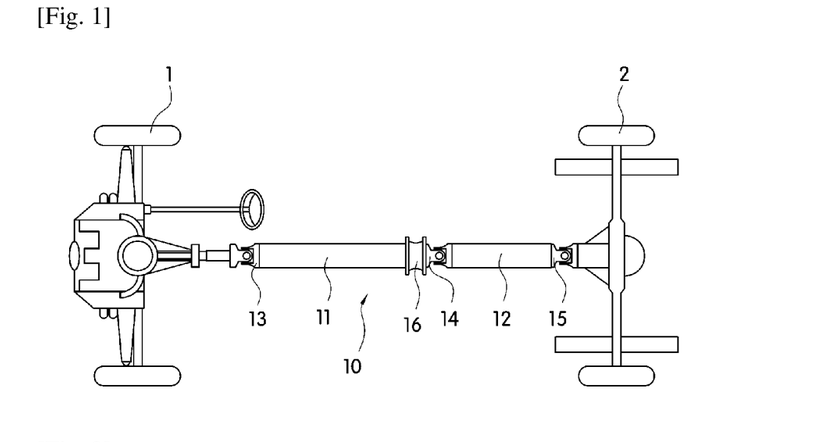
FIG. 1 is a plan view showing a power transmission structure of a typical vehicle.

FIG. 1 shows a power transmission structure of the rear-wheel drive vehicle based on a conventional technology. As shown in FIG. 1, since the engine and transmission are located in the front wheel 1, a drive shaft 10 is installed between the transmission and a rear axle and transmits a driving force. Connection portions are connected respectively by means of a universal joint. The drive shaft 10 is generally, as shown in FIG. 1, composed of two metal tubes 11 and 12. The drive shaft 10 is divided into two parts because the length of the drive shaft 10 is very large. It is better that the drive shaft 10 is manufactured with one part. However, the drive shaft 10 is divided into two parts because of a resonance frequency due to the vibration caused by driving a vehicle. In other words, if the drive shaft 10 is manufactured with one part, it is highly probable that a natural frequency and resonance are generated due to the vibration caused by driving a vehicle and it is not safe. Metal yokes 13, 14 and 15 for connection are installed at both ends of each of the two front and rear metal tubes 11 and 12 in the drive shaft 10. Particularly, since the two metal tubes 11 and 12 are connected to each other in the middle of the drive shaft 10 by means of the yoke 14, a center support bearing 16 is provided and fixed to the vehicle chassis in order to maintain the straightness.

Meanwhile, a conventional technology is disclosed in the publication of Korean Patent Application No. 10-2006-0053299. This invention relates to a connection structure between the propeller shaft and the rear axle shaft. The structure of the drive shaft designated as the propeller shaft is well shown. As mentioned above, there are still problems for the conventional technology, since the connection structure is composed of two metal tubes.

The problem caused by the drive shaft is composed of two tubes is at present a serious obstacle to the technology development for high fuel efficiency and being lightweight.

Meanwhile, the friction-stir welding has been developed by British TWI (The Welding Institute) in 1991. The friction-stir welding is a new welding process in which materials are melted into a semi-solid state by the heat generated by putting and rotating a friction tool, and then welding is performed with the mixture of the materials by the rotation of the friction tool. The friction-stir welding has fewer problems such as a protruding portion, periphery transformation due to high temperature heat, and residual stress, etc., which a general welding has. The friction-stir welding was used in aluminum welding in the early days, and recently is used in a variety of materials through technology developments. It can be also used in a liquid hydrogen fuel tank of a spaceship. However, it is difficult to apply the friction-stir welding to a complicated structure.

The friction-stir welding has the above advantages. However, the friction-stir welding is still a kind of welding. Therefore, since the friction tool moves on the bonding interface, a divot, i.e., a concave portion, is formed on that portion. Problems like residual stress, fatigue concentration, etc., which are less than those of the conventional technology occur on the bonding interface.

To solve the problems, a conventional technology is disclosed in the Korean Patent No. 0445142. This conventional technology discloses a friction-stir welding technology capable of preventing a concave portion which extends below the bonding surface from being formed in the bonding portion.

In the conventional technology, a thick portion protruding toward a rotating body bonding mechanism is provided at the end of the bonding portion of a frame member to be bonded. When two thick members, i.e., adjacent members to be bonded come in contact with each other, a trapezoidal shape is obtained. The rotating body bonding mechanism includes a front end having a small diameter and a portion having a large diameter. The rotating body bonding mechanism is inserted into the thick portion. In a position where the front end having a small diameter is first inserted and the portion having a large diameter is overlapped with the thick portion and does not extend below the top surface of the a non-thick side of the member to be bonded, the rotating body rotates and moves along the bonding portion. Despite a gap between the thick portions, a desirable bonding can be performed. After bonding, the remaining portion other than the thick portion is cut by a machine, and thus, a smooth surface is formed. According to the conventional technology, through the method as described above, the divot is prevented from being formed on the bonding interface.

However, in the use of the above technology, the portions of the adjacent members to be bonded, which first come in contact with each other, should be manufactured to form a trapezoid. This requires a increased cost. A shape which is not easy to manufacture requires a greater cost.

DISCLOSURE

Technical Problem

The present invention is designed to solve the aforementioned problems, and it is an object of the present invention to provide a drive shaft including one tube which reduces noise and vibration to the maximum degree by increasing a resonance frequency by bonding a composite material layer to the inside of a metal tube, and a metal yoke connected to both ends of the drive shaft by means of friction-stir welding, so that problems caused by mechanical connections or electric welding bonding are solved and reduction of the number of components, lightweight components, durability enhancement and energy reduction can be obtained, and a fabricating method thereof.

Also, the present invention is designed to solve the aforementioned problems, and it is an object of the present invention to provide a friction-stir welding method in which the bonding interface between members of which the vertical bonding surfaces generally come in contact with each other is manufactured to have a certain inclination angle and a friction tool is operated at a position out of the bonding interface. As a result, the divot is not formed on the bonding interface, and thus, it is possible to prevent previously a defect point, for example, stress concentration, fatigue concentration, etc.

Technical Solution

The present invention is designed to accomplish the above objective. The present invention provides a method for fabricating a drive shaft. The method includes: pressing a hollow cylindrical body made of a composite material into the inner circumferential surface of a metal tube by inserting a mandrel into the inside of the hollow cylindrical body in a state where the hollow cylindrical body is in close contact with the inner circumferential surface of the metal tube; applying a vacuum pressure by sealing the metal tube and the hollow cylindrical body with a film and by decompressing; molding the hollow cylindrical body into a composite material layer by heating in the state where the vacuum pressure has been applied; and bonding a connection member to both ends of the metal tube by friction-stir welding.

In the molding of the hollow cylindrical body into a composite material layer, a molding temperature is from 110 to 170° C., an air pressure is 5 to 7 kgf/cm$^2$ and the vacuum pressure sealed inside with the film is less than −0.2 bar.

The composite material includes carbon fiber and epoxy resin.

A bonding surface between the metal tube and the connection member is inclined at an angle of inclination ($\theta$) with respect to a surface which is perpendicular to an axial direction of the metal tube.

The angle of inclination ($\theta$) is $15° \leq \theta \leq 90°$.

The friction-stir welding between the metal tube and the connection member is performed by inserting a welding tool into a certain position on a bottom side of the bonding surface.

The connection member is a metal yoke.

The drive shaft according to the embodiment of the present invention includes: a cylindrical metal tube; a composite material layer bonded to the inner surface of the metal tube; and a metal yoke of which a portion is inserted into both ends of the metal tube and to which a bonding surface is combined A bonding surface between the metal tube and the metal yoke is inclined with respect to a surface which is perpendicular to an axial direction of the metal tube.

The angle of inclination ($\theta$) of the bonding surface is $15° \leq \theta \leq 90°$.

The present invention is designed to accomplish another objective. The present invention provides a friction-stir welding method which welds members by means of heat generated by a friction tool in a state where two members are in contact with each other. The two members come in contact with each other in a state where a portion of a bonding interface between the two members is formed to be inclined at a certain angle. The welding is performed by inserting the friction tool into a position spaced apart from the bonding interface by a certain distance.

The bonding interface is inclined at an angle ($\theta$) of $15° \leq \theta \leq 90°$ with respect to the vertical bonding interface.

The friction tool is used in a bisection point with respect to the inclined bonding interface.

The bonding interface includes an inclined surface and a vertical surface.

Advantageous Effects

The present invention has the following advantages.

(1) The composite material layer is bonded to the inside of an aluminum tube and a metal yoke connected to both ends of the drive shaft by means of friction-stir welding. As a result, the complicated mechanical connection structure can be simplified and integrated and lightweight components can be obtained.

(2) Since the drive shaft is composed of one metal tube, the complicated connection structure for connecting the metal tubes is removed. As a result, the structure can be simplified, and thus, the number of components is reduced and a vehicle assembly time is reduced.

(3) The bonding surface where the friction-stir welding is performed between the metal tube and the metal yoke is formed to be inclined, so that a defect point (tool escape divot) caused by an escape tool at the end of the friction-stir welding process is formed to deviate from the bonding interface. As a result, stress concentration or other defects which are caused by the defect point are prevented in advance. Also, the welding area of the two bonding surfaces is maximized, thereby providing a greater bonding strength.

(4) The welding is performed with the friction tool inserted into a position out of a certain range from the bonding interface. Accordingly, the divot remaining during the escape of a welding tool is not formed on the bonding interface. As a result, it is possible to prevent in advance that the bonding interface is destroyed by the stress concentration and fatigue concentration.

BEST MODE

The above-described objective, characteristics and advantages of the present invention will be clearer from the following detailed description. Hereafter, an embodiment of the present invention will be described in detail with reference to the accompanying drawings.

Figure 2:
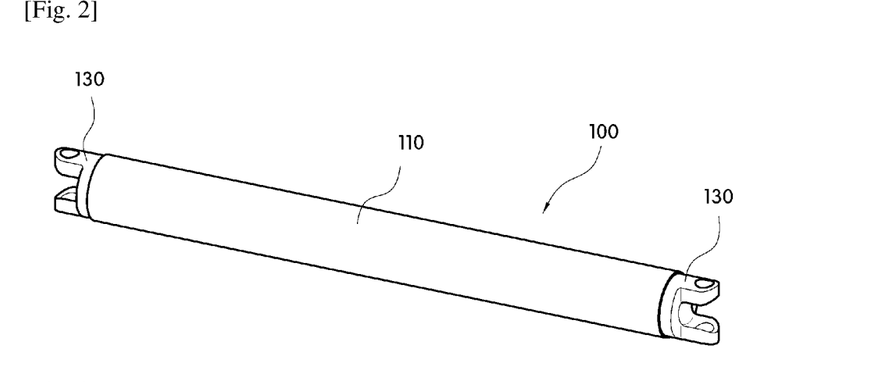
FIG. 2 is a perspective view of a drive shaft according to an embodiment of the present invention.
Figure 3:
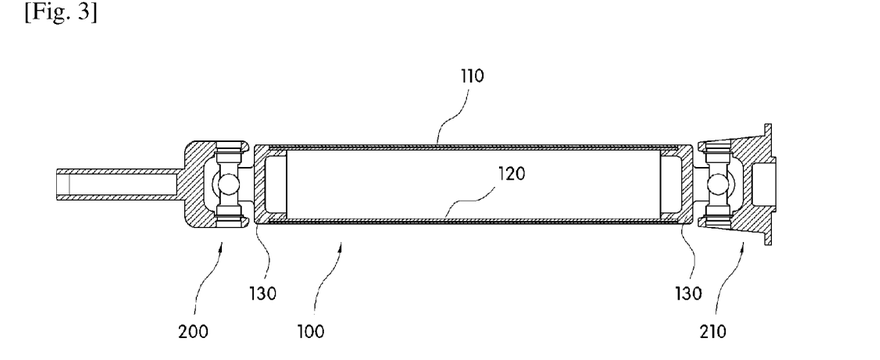
FIG. 3 is a longitudinal sectional view of the drive shaft according to the embodiment of the present invention.
Figure 4:
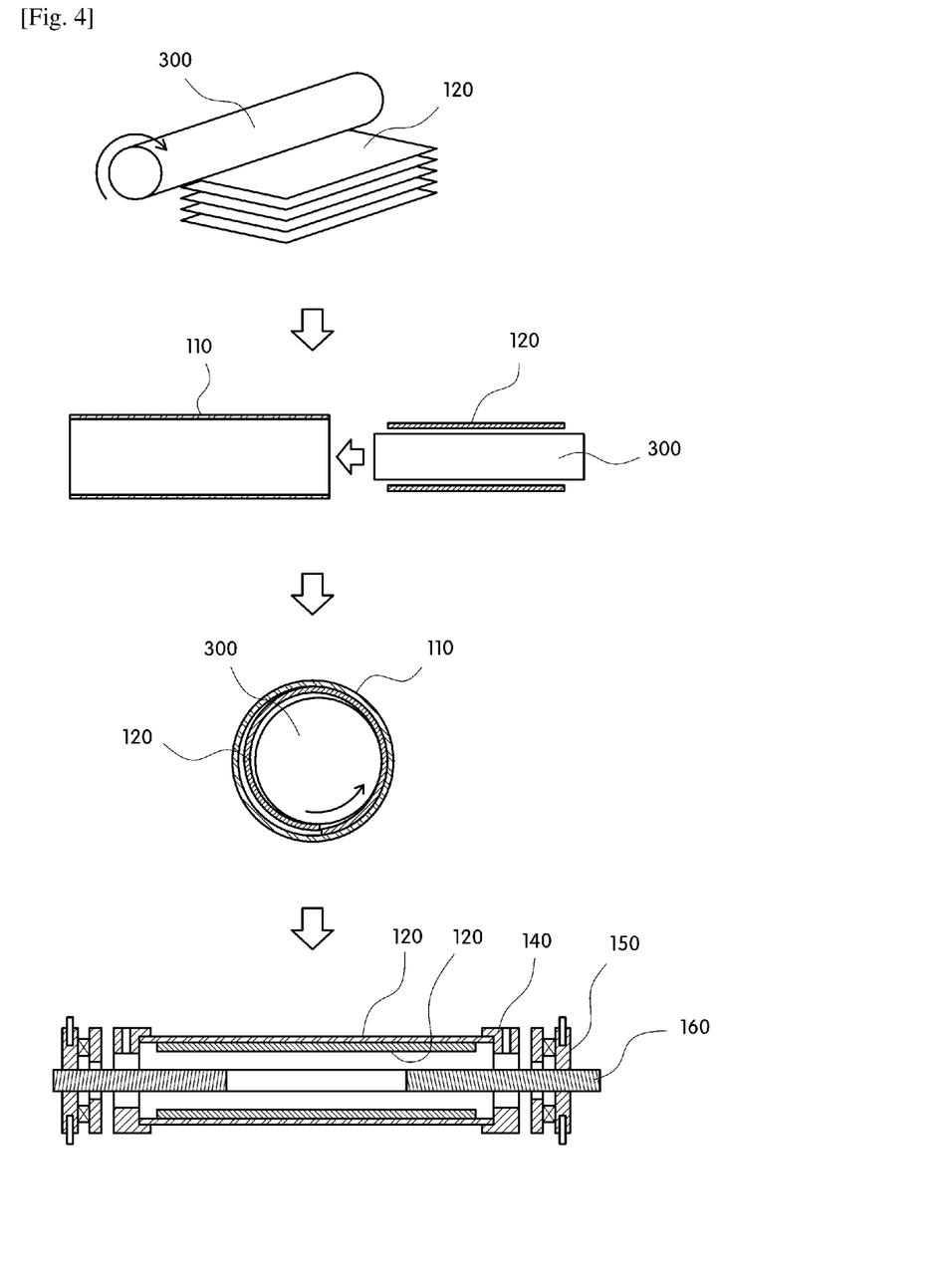
FIG. 4 is a mimetic diagram showing sequentially the order of a method for manufacturing the drive shaft according to the embodiment of the present invention.

The embodiment of the present invention is shown in FIGS. 2 to 4.

FIG. 2 shows a finished product of a drive shaft according to the embodiment of the present invention. The drive shaft 100 includes one metal tube 110, a metal yoke 130 assembled and coupled to both ends thereof, and a composite material layer 120 thereinside. The metal tube 110 is made of aluminum. The metal yoke 130 is also made of aluminum. It goes without saying that the metal tube 110 and the metal yoke 130 are made of other metallic materials or an aluminum alloy. This alloy may include nickel or magnesium. A level difference is formed on the yoke 130. A portion of the yoke 130 is inserted into the inside of the metal tube such that two bonding surfaces come in contact with each other with a certain inclination angle. The height of the outer surface of the yoke 130 is almost the same as that of the metal tube 110. In this state, the yoke 130 is coupled to the metal tube 110 by means of friction-stir welding.

Referring to FIG. 3, the yokes 130 are connected to a universal joint respectively, a front joint 200 is connected to a transmission, and a rear joint 210 is connected to a rear axle shaft, so that a driving force of an engine is transmitted to a rear wheel. The composite material layer 120 made of a composite material is bonded to the inside of the metal tube 110. The composite material layer 120 may be made by stacking carbon fiber and epoxy resin in the form of several layers. In this case, the metal tube 110 functions to transmit a torque and the composite material layer 120 increases a natural frequency, so that the drive shaft can be manufactured of one tube, instead of connecting two tubes. That is, rigidity to properly transmit the torque is obtained and the natural frequency of the drive shaft is increased, so that noise and vibration due to the resonance can be solved. The composite material layer 120 can be also made by stacking various materials as well as carbon fiber.

FIG. 4 is a mimetic diagram showing a method for manufacturing the drive shaft 100 according to the embodiment of the present invention. As shown, first, the composite material layer 120 made by stacking is formed in the shape of a cylinder by using a mandrel 300. In other words, in a state where the mandrel 300 is in close contact with the top surface of the sheet-shaped composite material, the mandrel 300 is rolled with a pressure, so that the composite material layer 120 has a cylindrical shape. The cylindrical composite material layer 120 is inserted into the inside of the metal tube 110 and the metal tube 110 is fixed. In this state, the mandrel 300 rotates in a bonding manner, so that the composite material layer 120 is bonded to the inside of the metal tube 110. The inside of the metal tube 110 is vacuumized and maintained for a certain time period, and then the vacuum state is released. That is, a cover 140 which discharges the air inside the metal tube 110 and vacuumizes is closely adhered to both sides of the metal tube 110 having the composite material layer 120 closely bonded to the inside thereof. In this state, a stopper 150 including a handle and a fastening screw 160 which passes through the central portion thereof is tightened, and then the inside of the metal tube 110 is vacuumized by discharging the air through a flow path which has been formed in the cover 140 and forms a vacuum pressure. As such, when the inside of the metal tube 110 is vacuumized, air between the inner surface of the metal tube 110 and the composite material layer 120 is discharged, so that the metal tube 110 and the composite material layer 120 are physically and completely in close contact with each other. Therefore, they are firmly bonded and integrally formed. As a result, as described above, the natural frequency of the entire drive shaft 100 is increased.

Figure 5:
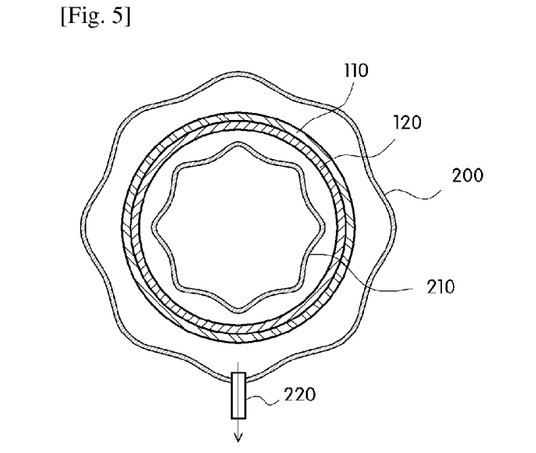
FIG. 5 is a view showing a state of a process of vacuumizing the inside of a metal tube during a process of manufacturing the drive shaft according to the embodiment of the present invention.

The vacuum state is obtained by discharging the air in this method. Besides, in the state where the composite material layer 120 is in close contact with the inner surface of the metal tube 110, and then, as shown in FIG. 5, an inner film 210 for vacuum is put into the inside of the metal tube 110 and the metal tube 110 is completely surrounded by an outer film 200. Then, the inner film 210 and the outer film 200 are connected and attached to each other such that the portion where the metal tube 110 and the composite material layer 120 are present is sealed. Next, a nozzle 220 is connected to a vacuum pump, and then the air between the inner film 210 and the outer film 200 is discharged and a vacuum state is obtained. Due to the vacuum state, the composite material layer 120 is closely bonded to the inside of the metal tube 110 by the vacuum pressure.

Figure 6:
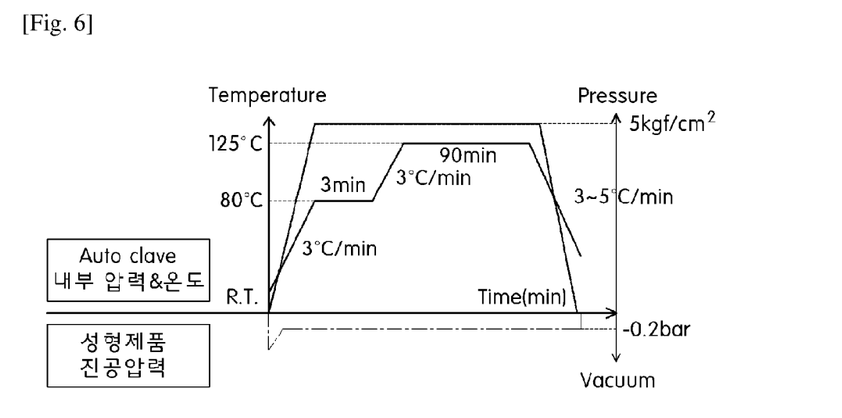
FIG. 6 is a graph showing a temperature and air pressure condition in an autoclave during the process of manufacturing the drive shaft according to the embodiment of the present invention.

Next, referring to FIG. 6, the metal tube 110 is put in an autoclave and heated, and then a composite material is molded. A molding temperature in the autoclave is from 110 to 170° C. and an air pressure in the autoclave is 5 to 7 kgf/cm$^2$. By doing this, the bonding and molding of the metal tube 110 and the composite material layer 120 are completed. Particularly, under a pressure of −0.2 bar, i.e., under a state where the vacuum pressure is applied to the metal tube 110 and the composite material layer 120, the metal tube 110 is supplied into the inside of the autoclave and the molding is performed. As a result, the composite material layer 120 is more firmly attached to the inside of the metal tube 110.

Then, the metal yoke 130 is bonded to the end of the metal tube 110 by means of friction-stir welding. The friction-stir welding is performed by generating frictional heat in a bonding basic material through the rotation of a welding tool. Since the friction-stir welding does not generate a molten state, the friction-stir welding does not generate defects such as a pore, solidification crack, residual stress, etc., which are caused by melting transformation due to heat shock, e.g., conventional arc-welding, etc. Therefore, the friction-stir welding requires the lower amount of input heat and improves mechanical properties caused by non-melting characteristics. In particular, like the present invention, aluminum is used for the purpose of being lightweight. When aluminum is used in a typical electric welding, aluminum is rapidly transformed, so that aluminum cannot be applied to the typical electric welding at all. However, when aluminum is used in the friction-stir welding, the problems are solved. Also, the friction-stir welding prevents the composite material from being transformed or lost in a weld portion by a high temperature of general welding. Since a conventional drive shaft is generally made of a steel material, it is very heavy and destroys the body of a vehicle upon the occurrence of a vehicle accident, so that there is a danger of doing harm to a driver. However, the drive shaft to which the friction-stir welding has been applied according to the embodiment of the present invention has necessary tensile strength and impact strength, is lightweight, and is broken at a yield point upon the occurrence of a vehicle accident such that the driver is protected without being damaged.

When the aluminum metal tube 110 is friction-stir welded with the yoke 130, a bonding occurs at a temperature lower than a low temperature transformation point.

In the friction-stir welding, basic materials to be welded come in close contact with each other and a pressure is applied to the basic materials so as to cause the basic materials to continuously come in close contact with each other. In this state, the welding tool is put to the close bonded surface and is rotated at an appropriate speed. Then, heat is generated from the basic material by friction-stir, and thus, a bonding occurs by the generated heat and pressure even though the basic material is not melted. In this state, the basic material is slowly rotated one time, and then, the friction-stir welding is completed. The welding time can be reduced by installing several welding tools.

Figure 7:
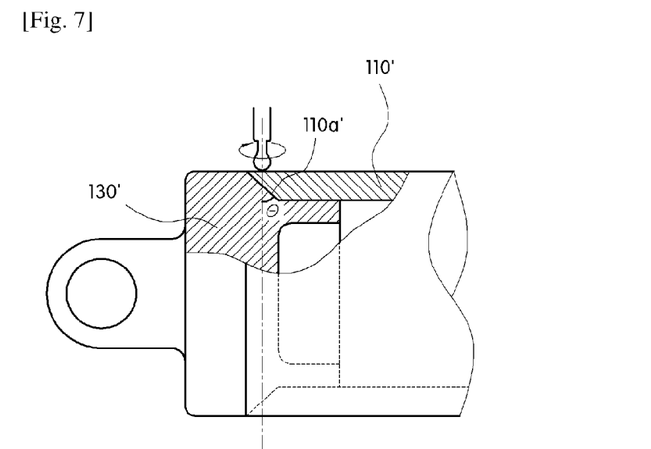
FIG. 7 is a cross sectional view showing a portion of friction-stir welding of the drive shaft according to another embodiment of the present invention.

Meanwhile, FIG. 7 shows another embodiment of the present invention. The different feature of another embodiment is that a bonding surface 110a' between a metal tube 110' and a yoke 130' is inclined at a certain angle (θ) with respect to the existing bonding surface. That is, while the existing bonding surface is perpendicular to an axial direction of the metal tube, the bonding surface 110a' is inclined at a certain angle with respect to the perpendicular surface. It is desirable that the angle (θ) should be 15°≤θ≤90°. When the bonding surface 110a' is inclined through coming in contact with each other, the welding tool does not go along the outermost vertical boundary line of the bonding surface 110a' but is located within a section where a heating zone is generated in the vicinity of the bonding surface 110a', and hereby stops the final contact point at a portion shown in FIG. 7, so that a defect point which occurs by escaping the welding tool is formed to deviate from the bonding interface 110a'. This is because when the friction-stir welding is performed and the welding tool escapes finally from the basic material, a depressed portion (divot) is formed and stress concentration may occur in the depressed portion, so that the depressed portion may function as the defect point. Therefore, the defect point is formed to deviate from the bonding interface 110a', so that a bonding strength can be maximized and problems such as destruction due to the stress concentration can be prevented in advance.

In FIG. 7, the bonding surface 110a' is formed to be inclined such that the yoke 130' enters the metal tube 110'. It can be considered that the bonding surface 110a' is reversely inclined.

Also, the embodiment of the present invention has been described based on the fact that the metal yoke is friction-stir welded into the metal tube. Besides, the friction-stir welding can also be applied to the connection of the metal tube and other components, such as another connection member like a flange as well as the metal yoke.

MODE FOR INVENTION

Figure 8:
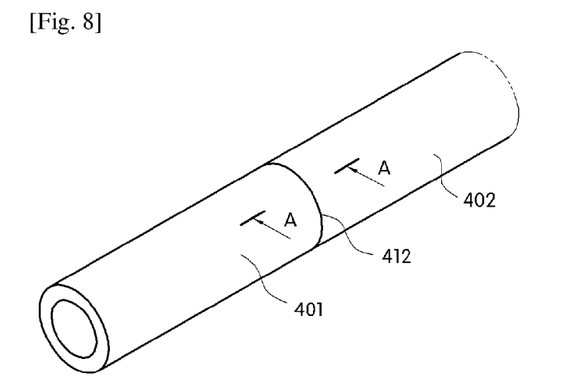
FIG. 8 is a perspective view showing two hollow cylindrical members to be used in the friction-stir welding according to the embodiment of the present invention.

FIG. 8 shows two members 401 and 402 to be used in the friction-stir welding according to the embodiment of the present invention. The two members 401 and 402 have a hollow cylindrical shape. The friction-stir welding is performed in a state where ends of the two members are in contact with each other. In a state where an appropriate force is slightly applied to both sides such that the ends come in contact with each other, the welding is performed while the inner surface and the surface of the members 401 and 402 are friction-stirred by a friction tool 500.

Figure 9:
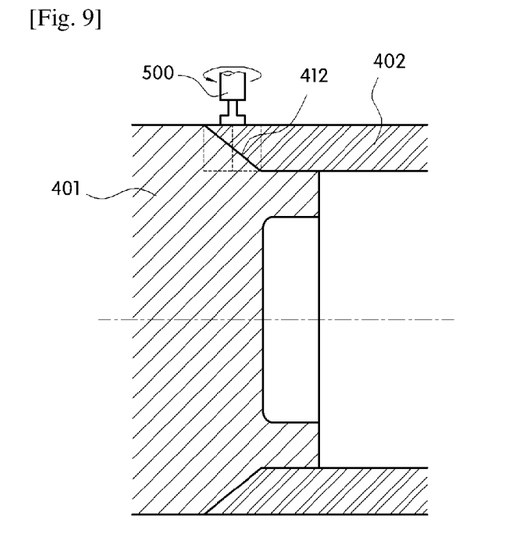
FIG. 9 is a cross sectional view taken along line A-A shown in FIG. 8.

FIG. 9 is a longitudinal sectional view of the member shown in FIG. 8. The two members 401 and 402 are in contact with each other and a portion of the one member 401 is inserted slightly into the inside of the other member 402. In particular, a bonding interface 412 where the two members 401 and 402 are friction-stir welded is formed to be inclined. The bonding interface is inclined at a certain angle with respect to a vertical line. In this state, as shown, the friction-stir welding is performed while the friction tool 500 is inserted into a position out of the bonding interface 412 and is rotated.

Figure 10:
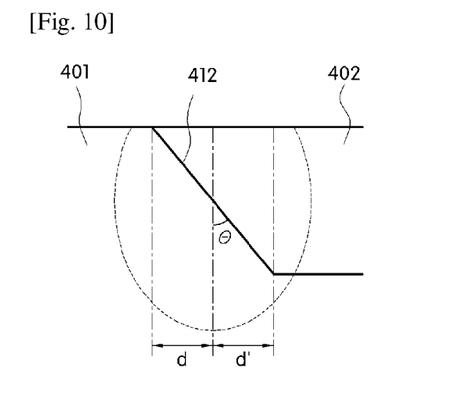
FIG. 10 is a detailed enlarged view of a bonding interface shown in FIG. 9.

FIG. 10 is an enlarged view showing the inclined bonding interface 412. As shown, the bonding interface 412 is inclined at a certain angle (θ). The angle (θ) is 15°≤θ≤90° with respect to a vertical bonding interface. A position where the friction tool 500 descends and starts to frictionize is a certain dividing point outside the inclined surface section. The friction-stir welding is performed while the friction tool 500 is inserted into the position.

Figure 11:
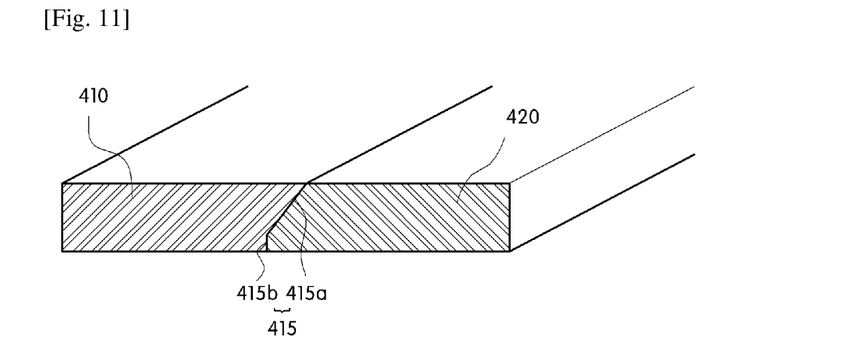
FIG. 11 is a perspective view of two flat plate members to be used in the friction-stir welding according to the embodiment of the present invention.
Figure 12:
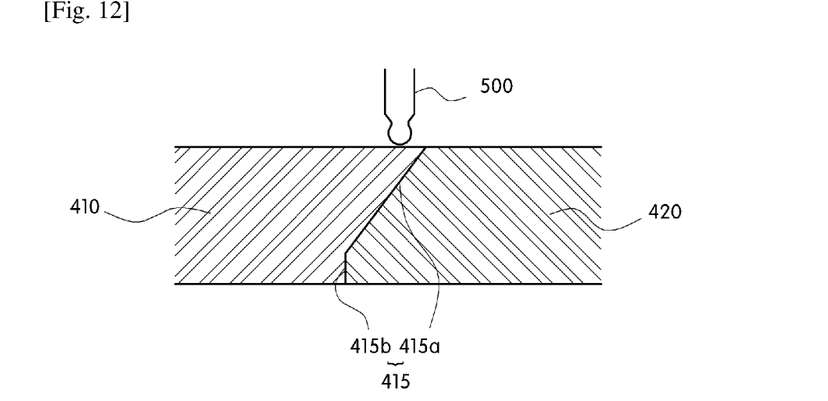
FIG. 12 is a detailed cross sectional view of the two members shown in FIG. 11.

FIG. 11 shows an example in which the friction-stir welding according to the embodiment of the present invention is applied to flat plate members 410 and 420. The two flat plate members 410 and 420 are also in contact with each other and the friction tool 500 is inserted, so that the welding is performed. Referring to the cross sectional view of FIG. 12, a bonding interface 415 includes an inclined surface 415a and a vertical surface 415b. Like the above-mentioned embodiment, the friction tool 500 is supplied to a certain dividing point outside the inclined surface section, for example, a bisection point, and the welding is performed. Even when a force pushing inward the member is applied to both sides of the member, the vertical surface 415b prevents the member from deviating from its position.

Figure 13:
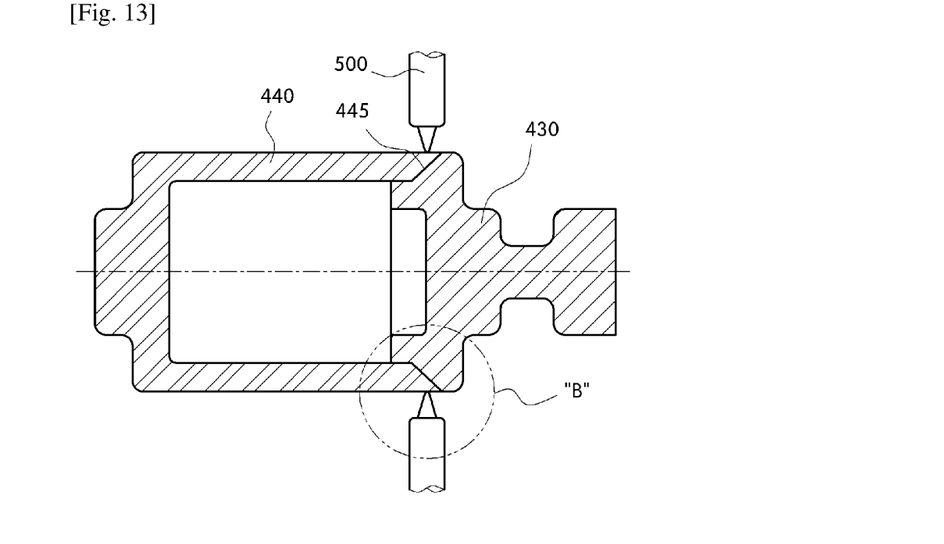
FIG. 13 is a cross sectional view showing two members of a piston, which are to be used in the friction-stir welding according to the embodiment of the present invention.
Figure 14:
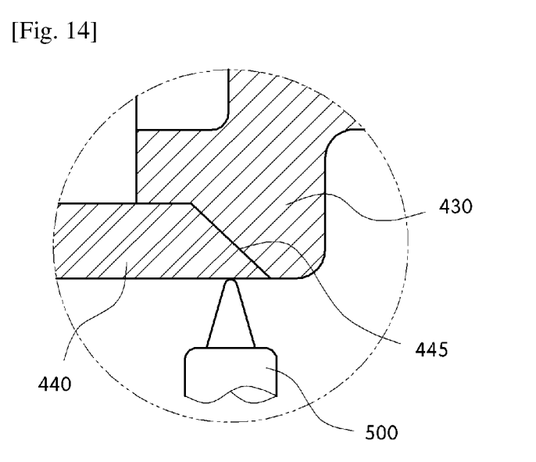
FIG. 14 is an enlarged view of a part "B" shown in FIG. 13.

FIGS. 13 and 14 show that the friction-stir welding according to the embodiment of the present invention has been applied to a header material 440 and a bridge material 430 which are semi-manufactured goods in a manufacturing process of a piston for a variable displacement swash plate type compressor. The header material 440 and the bridge material 430 have a circular cross section. The friction-stir welding is applied in the same manner as that shown in FIGS. 8 to 10.

The bridge material 430 is inserted slightly into the inside of the header material 440. A bonding interface 445 is formed to be inclined. The friction tool 500 is inserted into a certain dividing point of the bonding interface 445 and fractionizes, so that the friction-stir welding is performed.

When the friction-stir welding is performed in this manner, the slightly depressed divot is formed to deviate from the bonding interface 445. Therefore, the above-mentioned maximum effect of the present invention can be obtained without another device or means for filling the divot.

The above-described present invention is not limited by the foregoing embodiment and the accompanying drawings. It will be understood by those skilled in the art that various substitutions, modifications, and changes can be made without departing from the scope of the present invention.

INDUSTRIAL APPLICABILITY

The embodiment of the present invention can be applied to a drive shaft made of various materials and can be also applied to a technology for attaching and connecting a cylindrical component and a rotating pipe-shaped component.

The invention claimed is:

1. A drive shaft comprising:
   a cylindrical metal tube;
   a composite material layer bonded to an inner surface of the metal tube; and
   a metal yoke of which a portion is inserted into both ends of the metal tube and to which a bonding interface is combined by friction-stir welding,
   wherein the bonding interface between the metal tube and the metal yoke is inclined with respect to a surface which is perpendicular to an axial direction of the metal tube; and
   wherein a tip of a friction tool is inserted into a dividing point and is entirely positioned between first and second end points of the bonding interface outside an inclined surface section so as to facilitate the friction-stir welding.

2. The drive shaft of claim 1, wherein an angle ($\theta$) of the bonding surface is $15° \leq \theta \leq 90°$.

3. A drive shaft comprising:
   a cylindrical metal tube;
   a composite material layer bonded to an inner surface of the metal tube; and
   a metal yoke of which a portion is inserted into both ends of the metal tube and to which a bonding interface is combined by friction-stir welding,
   wherein the bonding interface between the metal tube and the metal yoke is inclined with respect to a surface which is perpendicular to an axial direction of the metal tube; and
   wherein a friction tool is inserted into a dividing point of the bonding interface outside an inclined surface section so as to facilitate the friction-stir welding; and
   wherein the dividing point is a bisection point.

* * * * *